United States Patent [19]

Fair et al.

[11] 4,122,909

[45] Oct. 31, 1978

[54] AIR CUSHION SKIRT

[75] Inventors: Delbert W. Fair; Graydon L. Brown, both of Ponca City, Okla.

[73] Assignee: Continental Oil Company, Ponca City, Okla.

[21] Appl. No.: 773,925

[22] Filed: Mar. 3, 1977

[51] Int. Cl.² .............................................. B60V 1/16
[52] U.S. Cl. ..................................... 180/127; 180/116
[58] Field of Search .................................. 180/116–127

[56] References Cited

U.S. PATENT DOCUMENTS

| 3,397,753 | 8/1968 | Hunt | 180/127 |
| 3,409,103 | 11/1968 | Tripp | 180/127 |
| 3,576,231 | 4/1971 | Jung | 180/124 |
| 3,693,729 | 9/1972 | Blurton | 180/127 X |
| 3,966,012 | 6/1976 | Crewe | 180/127 |

FOREIGN PATENT DOCUMENTS

| 740,750 | 8/1966 | Canada | 180/127 |
| 1,803,008 | 4/1969 | Fed. Rep. of Germany | 180/127 |
| 1,291,124 | 9/1972 | United Kingdom | 180/116 |

Primary Examiner—Joseph F. Peters, Jr.
Assistant Examiner—Terrance L. Siemens
Attorney, Agent, or Firm—William J. Miller

[57] ABSTRACT

An air retaining skirt for use with an air cushion vehicle of a type which utilizes a peripheral series of loop and segment sections in combination to provide retention of the air cushion over uneven terrain or water. The loops are adapted to extend from the air cushion vehicle outward and downward in flexible, air inflatable composure, and each loop supports a plurality of ground-contacting segments affixed to the lower edge thereof and extending back up for retention at or near the lower edge of the air cushion vehicle.

6 Claims, 12 Drawing Figures

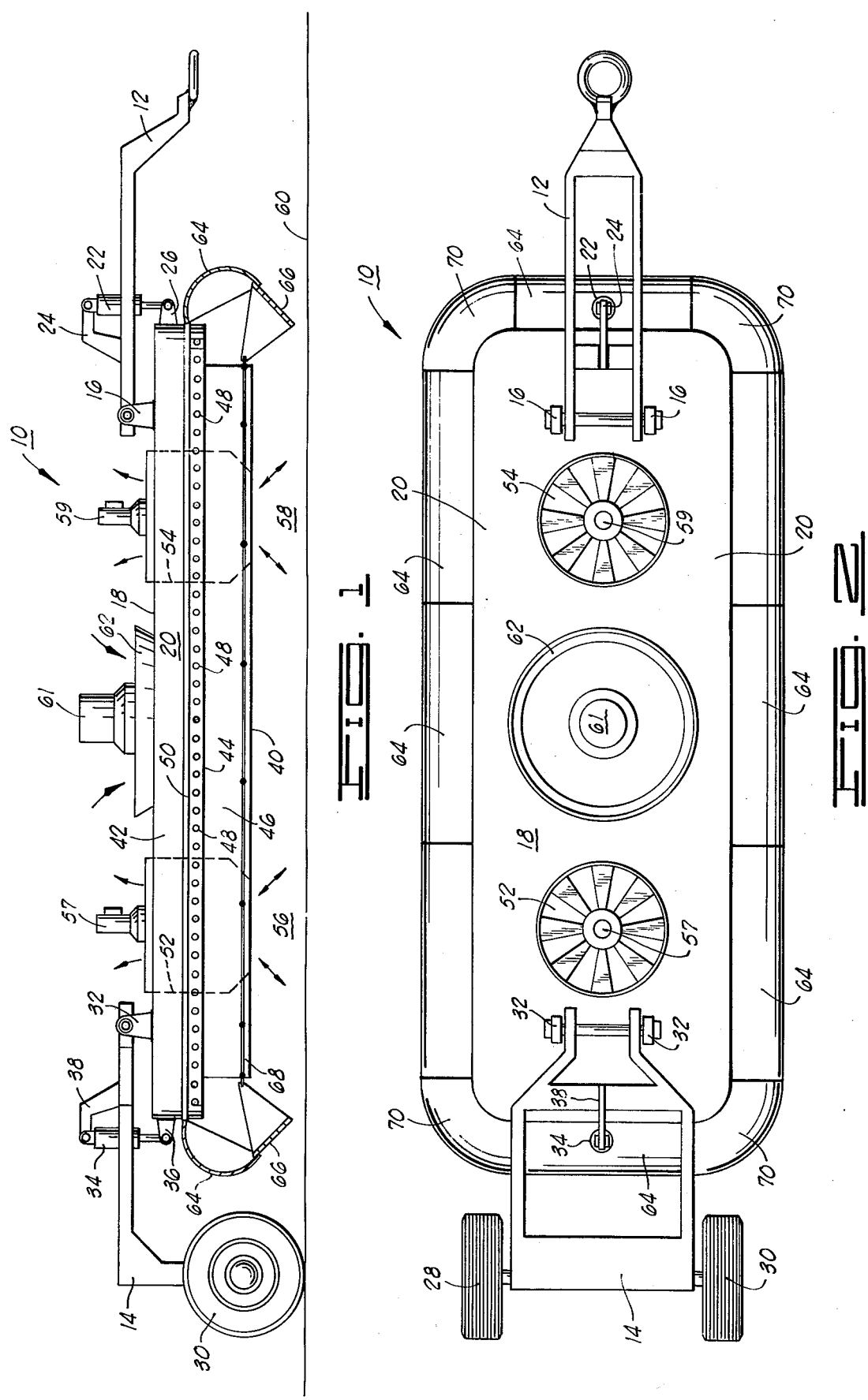

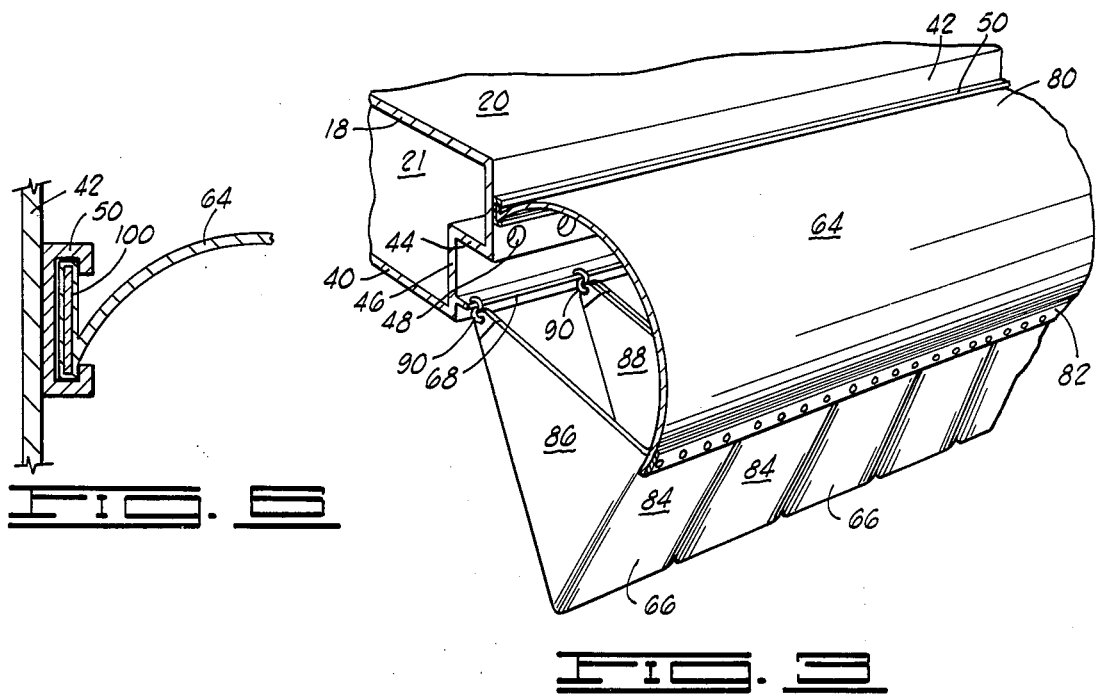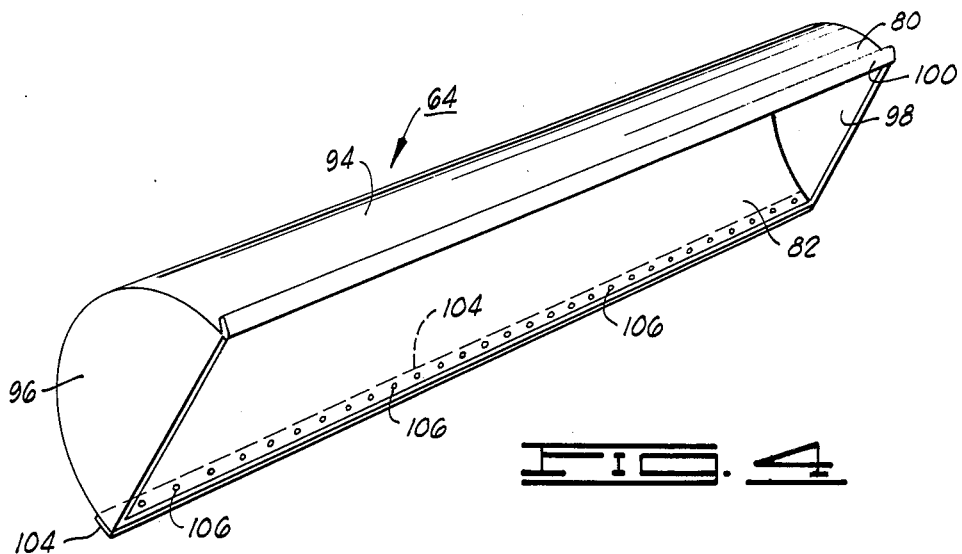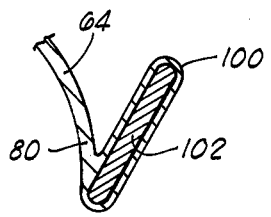

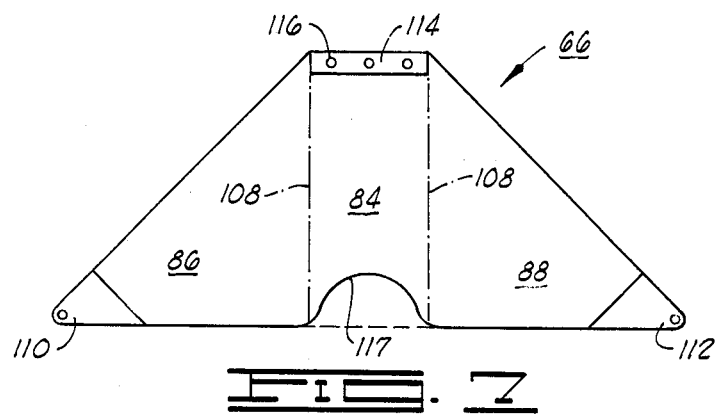
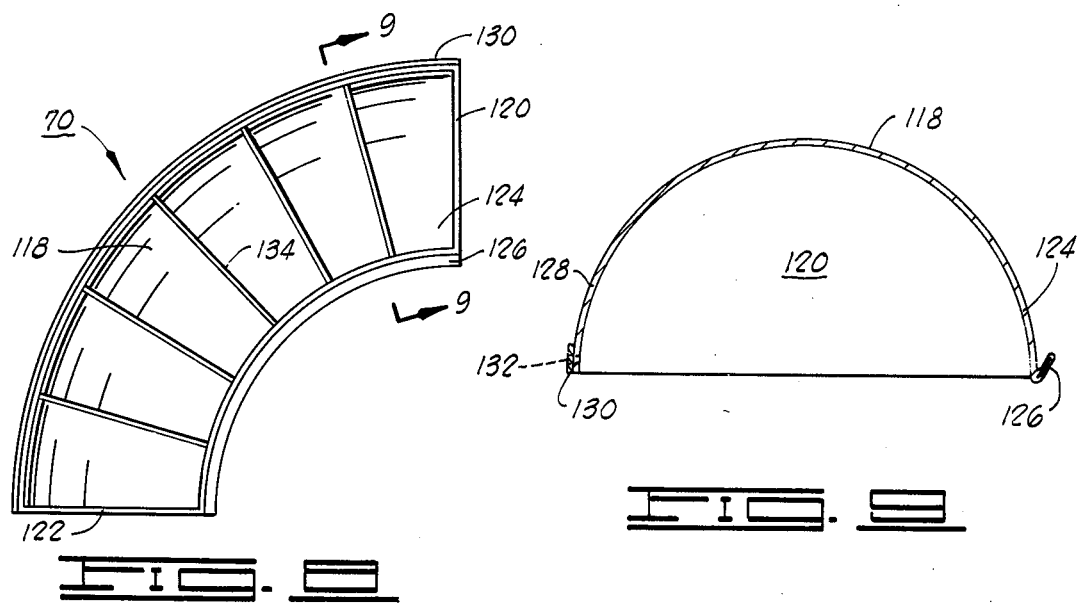
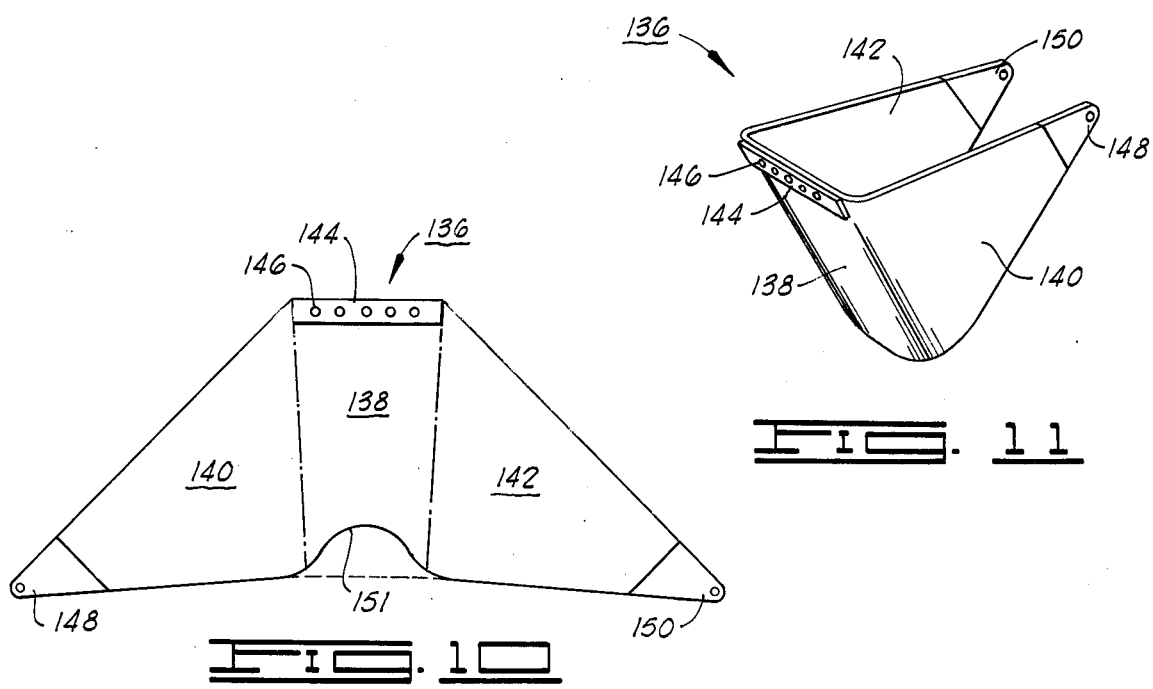

AIR CUSHION SKIRT

BACKGROUND OF THE INVENTION

1. Field of the Invention

The invention relates generally to skirt assemblies for air cushion vehicles and, more particularly, but not by way of limitation, it relates to improved skirt apparatus for use with an air cushion seismic energy vibrator.

2. Description of the Prior Art

The prior art includes many teachings which relate to the field of air cushion vehicles and skirt assemblies for aiding in air cushion formation. The form and function of the prior art types of devices have been dictated largely by the exigencies of those requirements stemming from vehicle movement and maneuverability. Applicant has discovered no prior art which relates to the particular combinative type air retention skirt such as the present invention which affords optimum function in an air cushion seismic energy vibrator. U.S. Pat. Nos. 3,362,499 and 3,481,424 may be noted as representative teachings; however, as previously stated, these prior art structures are directed to horizontal movement-oriented types of air cushion vehicle. U.S. Pat. No. 3,752,253 is also considered pertinent in setting the state of the art.

SUMMARY OF THE INVENTION

The present invention contemplates an air cushion skirt formation which includes a plurality of peripheral loop sections extending around the vehicle, each loop being further connected to a plurality of air retention segments which are movably retained at or near the lower edge of the vehicle.

Therefore, it is an object of the present invention to provide a flexible air retention element between the platform of an air cushion seismic vibrator and the earth surface in such manner that it will provide sufficient platform clearance with minimum air loss.

It is also an object of the present invention to provide an air cushion skirt which affords easy replacement of any skirt part with minimum time and loss of materials.

Finally, it is an object of this invention to provide a multi-element air cushion skirt for use with an air cushion seismic energy generator which skirt provides optimum balance of vertical forces during the air pressure modulation mode of operation.

Other objects and advantages of the invention will be evident from the following detailed description when read in conjunction with the accompanying drawings which illustrate the invention.

BRIEF DESCRIPTION OF THE DRAWINGS

FIG. 1 is a side elevation in idealized form of an air cushion seismic energy vibrator showing in section a skirt assembly constructed in accordance with the present invention;

FIg. 2 is a top plan view of the air cushion vibrator vehicle of FIG. 1;

FIG. 3 is a perspective view, partially in section, of a side loop section and multiple of ground-contacting segments of the present invention;

FIG. 4 is a perspective view of a side loop section;

FIG. 5 is a sectional view of the upper edge of a loop;

FIG. 6 is a sectional view of a loop upper edge and side fastener of the present invention;

FIG. 7 is a plan view of a segment as utilized in the present invention;

FIG. 8 is a top plan view of a corner loop section;

FIG. 9 is a section taken along lines 9—9 of FIG. 8;

FIG. 10 is a plan view of a corner segment;

FIG. 11 is a perspective view of a corner segment in operational attitude; and

DETAILED DESCRIPTION OF THE INVENTION

Figure 12:
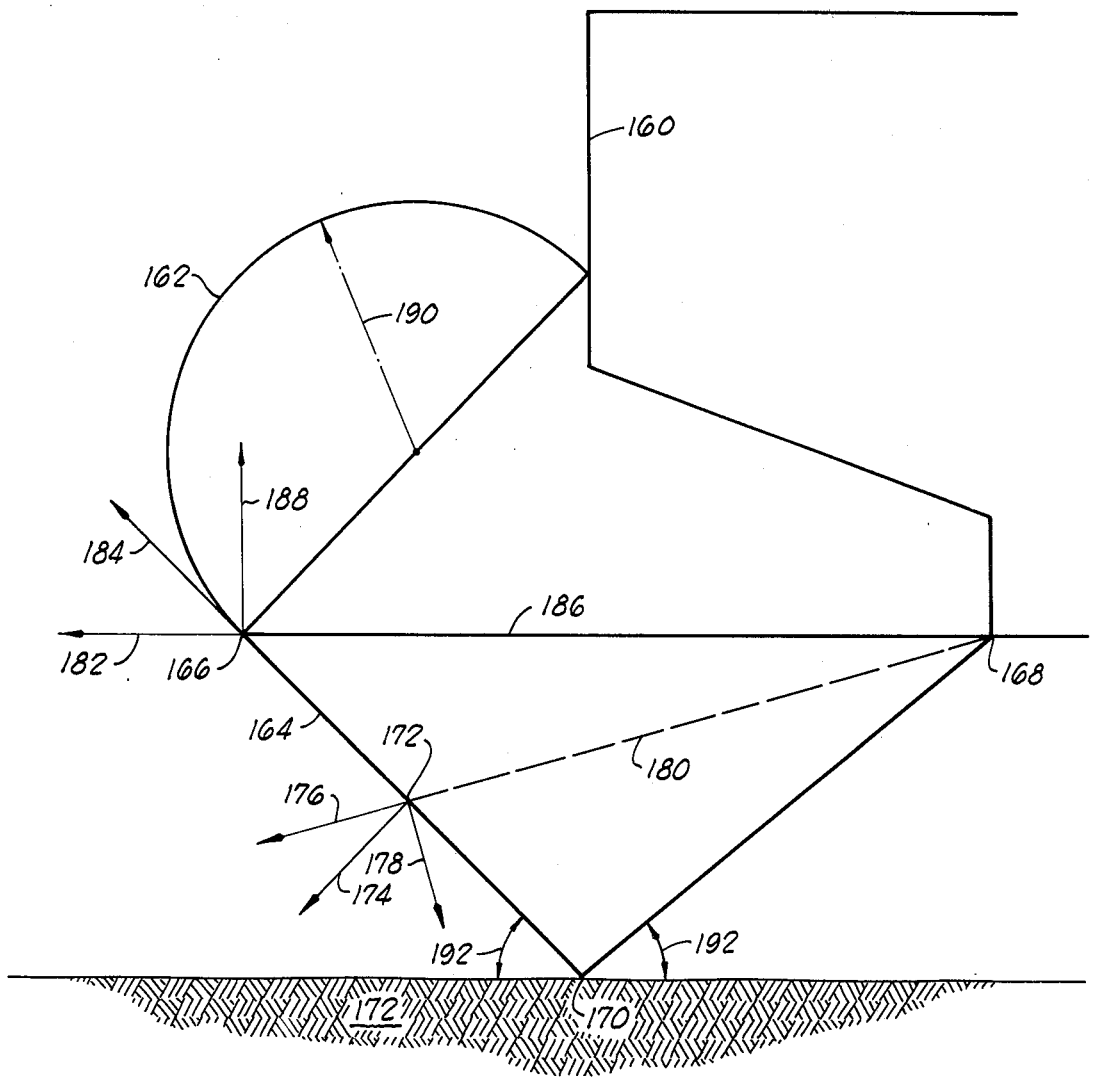
FIG. 12 is a schematic drawing illustrating the vectoral force moments of the loop and segment structure of the invention.

FIGS. 1 and 2 illustrate an air cushion vehicle or vibrator 10 of the type utilizing the present invention. The seismic vibrator and its attendant electrical control system are the particular subject matter of concurrently filed patent applications, an application Ser. No. 773924 entitled "Rotary Air Modulator" in the name of Delbert Fair, and an application Ser. No. 773926 entitled "Control System for Rotary Air Modulator" in the name of Graydon Brown et al, now U.S. Pat. No. 4,095,425.

The air cushion vibrator 10 is primarily transportable by means of a hitch support 12 suitably adapted for towing by a truck or other specialized motor vehicle. Th rear end of air cushion vibrator 10 is supported by a dual wheel assembly 14 during transport. The hitch assembly 12 is pivotally supported at pivot post 16 which is secured as by welding to the top plate 18 of frame 20. Hitch support 12 is adjustable as between operational attitude and transport attitude by means of a hydraulic cylinder 22 which is pivotally connected between a gooseneck 24 and a frame end post 26. The rear wheel assembly 14, including wheels 28 and 30, is similarly pivotally affixed by means of a frame post 32 with attitude position controlled by a hydraulic cylinder 34 functioning between a frame end post 36 and a gooseneck 38.

The frame 20 is a plate metal structure consisting of a top plate 18, bottom plate 40, upper side plate 42, peripheral plate 44 and lower side plating 46 extending into contact with lower plate 40. The lower edge of side plate 42 includes a large plurality of ports 48 extending entirely therearound to provide air under pressure outward into the skirt assembly, as will be described. An insert fastener rail 50 also extending entirely around frame 20 provides a securing point for the skirt loops, as also will be described.

The frame 20 defines a plenum chamber throughout its internal volume and rotary air modulators 52 and 54 are suitably disposed downward therethrough and, during operation, form a modulated air cushion as directed (in the illustrated case) at points 56 and 58 adjacent earth surface 60. The rotary air modulators 52 and 54 are more particularly described in the aforementioned U.S. patent application entitled "Rotary Air Modulator", filed concurrently herewith. Rotary air modulators 52 and 54 are driven by a hydraulic and electrical source equipment (not shown) and respective hydraulic motors 57 and 59. Air input to the plenum chamber within frame 20 is by means of a hydraulically driven fan compressor 61 suitably supported within a welded inlet cone 62. Fan 61 is but one form of source for supplying air under pressure into the plenum chamber within frame 20, and more particular attention to such air pressure supply is given in U.S. Pat. No. 3,792,751 in the name of Delbert Fair. While the air cushion vibrator 10 is shown as having two synchronized air modulators, it should be understood that such vibrator vehicles may utilize a single air modulator or a plurality greater than two, in which event control and synchronism will be compounded in order to provide the requisite frequency and phase as between plural output contributions to the air cushion.

In FIG. 1, the skirt assembly end portions only are shown, a loop 64 and segments 66 are secured at the front and rear ends of frame 20. Each loop 64 is secured at its upper edge to insert fastener 50, as will be more particularly described, and a plurality of segments 66 are then secured with suitable fasteners to the lower edge of loop 64 to extend inward for affixture to a clevis attachment rail 68 mounted about the lower edge of lower side plate 46. As shown in FIG. 2, a plurality of loops 64 are utilized along the sides and ends of frame 20 and each of the frame corners is enclosed by a skirt consisting of a corner loop 70.

FIG. 3 illustrates a sectional view of a portion of frame 20, as it defines internal plenum chamber 21, and a loop 64 in operative position while supporting a plurality of ground-contacting segments 66. An upper edge 80 of loop 64 is secured within insert rail 50 while a lower edge 82 is formed as a reinforced surface for fastener attachment of each of a plurality of segments 66. Each of segments 66 is formed to expose an outer surface 84 while extending support portions 86 and 88 inward for affixture by means of clevis fasteners 90 to peripheral rail 68. Corner skirt assemblies are similarly disposed as will be described below. All of the skirt sections, both loops and segments, are formed of rugged yet flexible material, e.g., Neoprene-coated nylon-reinforced fabric. It is important to proper operation that, when the skirt assembly is inflated, the segment outer surfaces 84 should lie in tangency relative to the arc defined by loop 64, as will be further described.

FIGS. 4 and 5 illustrate a loop 64 in greater detail. Thus, loops 64 consist of a rectangular panel 94 which is formed into a generally half-cylindrical configuration by attachment of opposite end panels 96 and 98. The upper edge 80 is formed to include an edge bead 100 for secure engagement within insert attachment 50 (FIG. 1). As shown in FIG. 5, the bead 100 may be formed by sewing or otherwise bonding a stiffener strip 102 within the flexible material of the loop 64. The stiffener 102 may be formed of such as polypropylene, nylon, metal, or the like. As shown in FIG. 6, the upper edge bead 100 is then adapted to be received within extruded fastener 50 which may be a commercially available channel strip known as FASTAK and available from Park Fastener Co., Jackson, Wy. It has also been found that the FASTAK cord-type fastener combination may better serve the intended function. In this case, the bead is formed about a parallel cord arrangement which, in turn, can be interlocked in engagement with a mating extruded strip.

Referring again to FIG. 4, the lower edge 82 of loop 64 is also reinforced by addition of a flexible reinforcement 104 secured as by bonding along the lower edge thereof. Reinforcement 104 may be formed of any suitable material, and a plurality of holes 106 are formed therealong for the purpose of removably securing the plurality of segment sections 66 therealong by use of readily removable fastener devices.

FIG. 7 illustrates a side segment section 66 in layout. Each segment section 66 consists of a rectangular central portion which constitutes the outer surface 84. In operating attitude, the section 66 folds generally along lines 108 to extend co-angular side panels 86 and 88, each of which is reinforced at tips 110 and 112 for formation of clevis attachment holes therethrough. Upper edge 114 is suitably reinforced and holes 116 are formed therethrough for mating engagement and fastener affixture through holes 106 along lower edge 82 of a loop 64. The central cut-out portion or tip trim 117, of elliptic shape, allows more complete ground contact with minimum air loss.

FIG. 8 illustrates a corner loop 70 which is formed in like manner to the side loops 64 with the exception that the required arcuate shape must be considered. Corner loop 70 is formed to turn a ninety degree corner and is formed with an arcuate sector surface panel 118 as attached to semi-circular end panels 120 and 122. Referring also to FIG. 9, an upper edge 124 is formed with a fastening bead 126, similar to that of FIG. 5, with internal stiffener member, and a lower end 128 has a reinforcing strip 130 bonded thereto for the purpose of defining a plurality of fastener holes 132. In some cases, it may be desirable to include bonded reinforcing supports 134 (FIG. 8) of desired stiffness and arcuate consideration on the panel 118.

FIGS. 10 and 11 illustrate a corner segment 136, a plurality of which are used in association with each of corner loops 70. The corner segments 136 are formed to have a slightly different angular side extension, as may be noted by comparison with segment 66 of FIG. 7. Thus, a central portion 138 is formed as a trapezoidal variance from rectangular, thus tending to orient the right triangle side panels 140 and 142 to a slight diverging, downward disposition. A reinforcing edge panel 144 is again formed with formation of a plurality of holes 146, e.g., five, for fastening to mating holes 132 along the lower edge 128 of corner loop 70. Reinforced tips 148 and 150 each define a securing hole for affixture to clevis attachment rail 58 along the corner positions of frame 20. FIG. 11 illustrates a corner segment 136 when in the operation attitude. Again, a generally elliptically cut out tip trim 151 is included to assure optimum ground contact at the corners.

In operation, a plurality of loops, loops 64 and corner loops 70, extend completely around the periphery of the platform frame 20 as they are attached to the platform by means of snap-in fastener 50. The fastener 50 is a well-known form of binding fastener which allows quick replacement of a loop when required. The loops are each formed with ends enclosed and with upper edges having stiffeners sewn or bonded thereto for coaction with the fastener 50. A plurality of side segments 66 and corner segments 136 are then secured in succession around the entire periphery of the assembly. The segments are secured to the lower side of the loops with such as bolts to enable easy segment replacement when necessitated. The inner corners of the segments are then retained by clevis attachment rail 68 about the lower extremity of the platform frame 20.

During flight of vibrator 10, air flows through ports 48 from plenum chamber 21 into the plurality of upper loops 64 and 70, which inflate to an arc shape. When the air pressure builds up within the air cushion, the platform frame 20 will rise to a flying height which is determined by the design of the skirt system. In the present case, the segments 66 and 136 allows the frame 20 to fly at a height sufficient to clear obstacles and to allow room for modulation with minimum air loss from the modulation air cushion 56–58.

During the air pressure modulation cycle, or output of seismic energy, the height of the platform will vary at the frequency rate of modulation. The skirt system flexibility will accommodate this movement with minimum air loss and allow the pressure modulation to be accomplished. Thus, the skirt system is designed so that, as the pressure in the cushion changes at the modulation rate, the force moments in the loops and segments are balanced thereby to maintain a stable system.

FIG. 12 illustrates in diagrammatic form the critical angles and dimensions of the loop end segment sections which enable optimum distribution of force moments in the present invention. Thus, in sectional form, a frame 160 has attached thereto a loop 162 and segment 164, a plurality of such segments 164 being disposed contiguously beneath each loop 162. Each of segments 164 is sealably connected beneath loop 162 at a point 166 while the inner ends of the segments are clevis-attached to frame 160 at a point 168, while the lower edge of the fold or point 170 is in ground contact with earth 172 or other surface such as effective water level, marsh land and the like.

In developing optimum loop segment design, a program was developed for the HP-9810 programmable calculator in order to evaluate the various design parameters. It was determined that the air pressure on the segment 164 produces a force acting perpendicular to the segment at its midpoint 172. This force, vector 174, can be resolved into a radial or tension component 176 and a tangential component 178. The tangential component 178 multiplied by the moment arm distance from the moment center at the hull attachment point 168, i.e., line 180, produces a downward movement from the segment 164. The pressure within loop 162 produces a loop tension force 184 which acts in line with the loop tangent which is also in line with the segment face at the attachment point 166. This loop tension 184 also can then be resolved into a radial force component 182 and a force component 188 which is tangential to the movement arm 186. The force 188 times the moment arm 186 produces an upward moment at the loop which must be balanced by segment moment. Since segment force is determined by the outer face area of the segment 164, once the form of the segment is specified a loop radius 190 can be calculated which will produce the correct balance of moments regardless of the air presure within the cushion. The loop radius can change to compensate for both short term dynamic change in the segment moment and also for long term wear changes causing change in segment moment.

It has been determined that the maximum theoretical angle between segment face and the earth, angles 192, is 60°. When the angle equals 60° there is no tangential force on the segment with which to produce a downward moment. A corollary to the conclusion is that the practical maximum angle is 45°, since at this angle the tangential force on the bottom fiber of segment 164 becomes zero so there is no downward moment to maintain stable contact with the earth. With such 45° design, it poses no problem because wear and fabric strength both tend to decrease the operating angle to less than 45°. However, experimental results show that optimum design would set angle 192 in the range of 42° to 44°. In the design as characterized by FIG. 12, the following are dimension ratios for a frame flying height H (14 inches is a typical value for H).

Thus, the dimensions are:
line 168-170 - 1.495 H = 20.93 inches;
line 180 — 1.725 H = 24.15 inches;
line 186 — 2.221 H = 31.09 inches;
line 166-170 — 1.495 H = 20.93 inches;
line 190 - 0.908 H = 12.71 inches; and
the contact angles 192 become 42°.

The foregoing discloses an air cushion vehicle and, more particularly, a seismic vibrator of the air modulator type which utilizes a novel form of air retention skirt assembly having both functional and utilitarian attributes. The skirt assembly is designated to provide optimum balance of force moments during operation and variation of flow to the air cushion. In the event of damage to part of the skirt assembly, the modular construction enables rapid and economical repair to once again make the vehicle operational.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:
1. An air retention skirt apparatus for use with air cushion vehicles of the type having at least one peripheral side structure and bottom beneath which an air cushion is formed, comprising:
  plural loop sections affixed serially around the peripheral side structure in arcuate attitude to surround and retain said air cushion, said plural loop sections including a plurality of loop sections for affixture to the straight peripheral side structure and a plurality of corner loop sections for affixture to the curved peripheral side structure; and
  plural segment sections affixed continuously in series along each of said loop sections, each segment section being secured to the loop section and extending a pair of securing flaps inward for affixture to the peripheral side structure proximate said bottom in attitude to retain said air cushion, said plural segment sections including a first plurality of segment sections having a generally rectangular central panel extending into securing flaps which are foldable at 90° to extend in parallel and with each terminating in a fastener tab pivotably affixed to said peripheral side structure proximate said bottom, and said plural segment sections further including a second plurality of corner segment sections having a central panel having parallel upper and lower edges and defining oppositely angled side securing flaps which are each foldable more than 90° to extend in convergence and with each terminating in a fastener tab pivotably affixed to said peripheral side structure proximate said bottom.

2. Apparatus as set forth in claim 1 wherein each of said loop sections comprises:
  a rectangular panel having first and second edges and first and second ends;
  first and second generally semi-circular end panels having their arcuate edges secured co-extensively to said respective first and second ends; and
  a reinforcing strip secured to said first edge to provide secure affixure to said peripheral side structure.

3. Apparatus as set forth in claim 1 wherein each of said corner loop sections comprises:
  an arcuate panel having first and second generally parallel arcuate edges and first and second ends of equal length;
  first and second generally semi-circular end panels having their arcuate edges secured co-extensively to said respective first and second ends of said arcuate panel; and a reinforcing strip secured to said first edge to provide secure affixture to said peripheral side structure.

4. Apparatus as set forth in claim 1 which is further characterized to include:

rail means secured about said peripheral side structure proximate said bottom to receive in pivotable affixture all fastener tabs of all segment and corner segment sections.

5. Apparatus as set forth in claim 1 which is further characterized to include:

channel means secured around the peripheral side structure to receive and retain said first edge having a reinforcing strip of all loop sections.

6. Apparatus as set forth in claim 1 which is further characterized in that:

each of said segment and corner segment central panels is formed with an elliptically shaped tip trim to produce a line contact with the earth surface thereby to minimize air leakage.

* * * * *